(12) United States Patent
Choi et al.

(10) Patent No.: US 12,189,367 B2
(45) Date of Patent: Jan. 7, 2025

(54) APPARATUS AND METHOD FOR GENERATING EXCITATION SIGNAL FOR RESOLVER

(71) Applicant: HYUNDAI MOBIS CO., LTD., Seoul (KR)

(72) Inventors: Yun Ho Choi, Yongin-si (KR); Hyung Min Park, Yongin-si (KR); Joo Won Park, Yongin-si (KR); Yeon Ho Kim, Yongin-si (KR); Won Hee Jo, Yongin-si (KR); Tae Hwan Kang, Yongin-si (KR); Beom Cheol Cho, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 169 days.

(21) Appl. No.: 18/089,172

(22) Filed: Dec. 27, 2022

(65) Prior Publication Data
US 2024/0069524 A1    Feb. 29, 2024

(30) Foreign Application Priority Data

Aug. 29, 2022    (KR) .......................... 10-2022-0108270

(51) Int. Cl.
*G05B 19/4155*    (2006.01)
(52) U.S. Cl.
CPC ..................... *G05B 19/4155* (2013.01); *G05B 2219/37473* (2013.01)
(58) Field of Classification Search
CPC ...... G05B 19/4155; G05B 2219/37473; G01D 5/204; H02P 1/26; H02P 6/00; H02P 6/007; H02P 6/12; H02P 6/28; H02P 7/29; H02P 9/102; H02P 21/18; H02P 21/22; H02P 23/07; H02P 25/062; H02P 25/064; H02P 27/06; H02P 27/08; H03K 5/02

See application file for complete search history.

(56) References Cited

U.S. PATENT DOCUMENTS

| | | | |
|---|---|---|---|
| 2015/0362338 A1* | 12/2015 | Klesyk | G01D 5/2073 324/207.15 |
| 2016/0087561 A1 | 3/2016 | Rho et al. | |
| 2021/0033636 A1 | 2/2021 | Bang | |

FOREIGN PATENT DOCUMENTS

| | | |
|---|---|---|
| KR | 10-2009-0106862 A | 10/2009 |
| KR | 10-2016-0066923 A | 6/2016 |

OTHER PUBLICATIONS

Extended European Search Report issued on Sep. 15, 2023, in counterpart European Patent Application No. 22216912.0 (5 pages in English).

(Continued)

*Primary Examiner* — Antony M Paul
(74) *Attorney, Agent, or Firm* — NSIP Law (57) ABSTRACT

Disclosed is an apparatus for excitation signal generation for a resolver. The apparatus includes a sine wave generator that generates a sine wave based on a square wave, an amplifier that amplifies the sine wave, a differential signal generator that converts, into a differential signal, the amplified sine wave, a driver that inputs the differential signal to a coil, and a processor that generates an excitation signal by increasing a voltage of the sine wave from a start voltage to a target voltage through at least one of the sine wave generator and the amplifier based on a transient current that flows into the coil in a transient response interval.

20 Claims, 4 Drawing Sheets

(56) References Cited

OTHER PUBLICATIONS

Korean Office Action Issued on Apr. 12, 2024, in Counterpart Korean Patent Application No. 10-2022-0108270 (5 Pages in Korean).

* cited by examiner

APPARATUS AND METHOD FOR GENERATING EXCITATION SIGNAL FOR RESOLVER

CROSS-REFERENCE TO RELATED APPLICATION

This application claims the benefit under 35 USC § 119(a) of Korean Patent Application No. 10-2022-0108270, filed on Aug. 29, 2022, in the Korean Intellectual Property Office, the entire disclosure of which is incorporated herein by reference for all purposes.

BACKGROUND

1. Field

The present disclosure relates to an apparatus and method for generating an excitation signal for a resolver that prevents an overcurrent greater than an actual application range from flowing into a coil.

2. Description of Related Art

A hybrid electric vehicle (HEV)/electric vehicle (EV) is a motor-driven vehicle using a motor that is driven through an inverter. The motor for the vehicle includes a rotor and a stator.

The HEV also includes a resolver that receives an excitation signal, that is, a sine wave of several kHz, as an input signal, and detects an angle of the rotor of the motor. The excitation signal is a signal that is applied to the resolver of the motor in order to obtain information on the angle of the rotor.

An excitation signal generation circuit amplifies the sine wave signal that is received through a voltage amplifier (of the excitation signal generation circuit) at a steady amplification ratio to generate the excitation signal. A current amplifier of the excitation signal generation circuit generates the excitation signal by amplifying the amplified sine wave signal at a steady amplification ratio. If the excitation signal is applied to the resolver, however, an overcurrent that is out of an actual application range may flow in a transient response due to characteristics of the resolver before the state of the excitation signal reaches a normal state.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided an apparatus for excitation signal generation for a resolver. The apparatus includes a sine wave generator that generates a sine wave based on a square wave, an amplifier that amplifies the sine wave, a differential signal generator that converts, into a differential signal, the amplified sine wave, a driver that inputs the differential signal to a coil, and a processor that generates an excitation signal by increasing a voltage of the sine wave from a start voltage to a target voltage through at least one of the sine wave generator and the amplifier based on a transient current that flows into the coil in a transient response interval.

In response to a maximum current of the transient current in the transient response interval meeting or exceeding a preset threshold current, the processor may increase the voltage of the sine wave up to the target voltage through at least one of the sine wave generator and the amplifier.

The processor may increase the voltage of the sine wave step by step by a set voltage from a preset start voltage whenever one cycle elapses.

The start voltage may be adjusted based on the target voltage.

The processor may adjust an amplification ratio of the sine wave generator.

The processor may adjust an amplification ratio of the amplifier.

The processor may divide the start voltage into a plurality of voltage ranges, and control at least one of the sine wave generator and the amplifier based on a voltage range to which the start voltage belongs, among the voltage ranges.

When the start voltage belongs to a first voltage range, the processor may fix an amplification ratio of the amplifier and adjust an amplification ratio of the sine wave generator.

The processor may fix the amplification ratio of the amplifier to a minimum value.

When the start voltage belongs to a second voltage range, the processor may fix an amplification ratio of the sine wave generator and adjust an amplification ratio of the amplifier.

The processor may fix the amplification ratio of the sine wave generator to a maximum value.

In another general aspect, a method of excitation signal generation for a resolver is provided. The method includes calculating, by a processor, a transient current that flows into a coil in a transient response interval, and generating an excitation signal by increasing, by the processor, a voltage of a sine wave from a start voltage to a target voltage through at least one of a sine wave generator and an amplifier based on the transient current.

Increasing the voltage of the sine wave from the start voltage to the target voltage may further include, in response to a maximum current of the transient current in the transient response interval meeting or exceeding a preset threshold current, increasing, by the processor, the voltage of the sine wave up to the target voltage through at least one of the sine wave generator and the amplifier.

Increasing the voltage of the sine wave from the start voltage to the target voltage may further include increasing the voltage of the sine wave step by step by a set voltage from a preset start voltage whenever one cycle elapses.

The start voltage may be adjusted based on the target voltage.

Increasing the voltage of the sine wave from the start voltage to the target voltage may further include adjusting an amplification ratio of the sine wave generator.

Increasing the voltage of the sine wave from the start voltage to the target voltage may further include adjusting an amplification ratio of the amplifier.

Increasing the voltage of the sine wave from the start voltage to the target voltage may further include dividing the start voltage into a plurality of voltage ranges, and controlling at least one of the sine wave generator and the amplifier based on a voltage range to which the start voltage belongs, among the voltage ranges.

Increasing the voltage of the sine wave from the start voltage to the target voltage may further include, when the start voltage belongs to a first voltage range, fixing, by the processor, an amplification ratio of the amplifier and adjusting an amplification ratio of the sine wave generator.

Increasing the voltage of the sine wave from the start voltage to the target voltage may further include fixing the amplification ratio of the amplifier to a minimum value.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is adequately disclosed, and a person with ordinary skill in the art can fully understand the scope of the present disclosure. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 1:
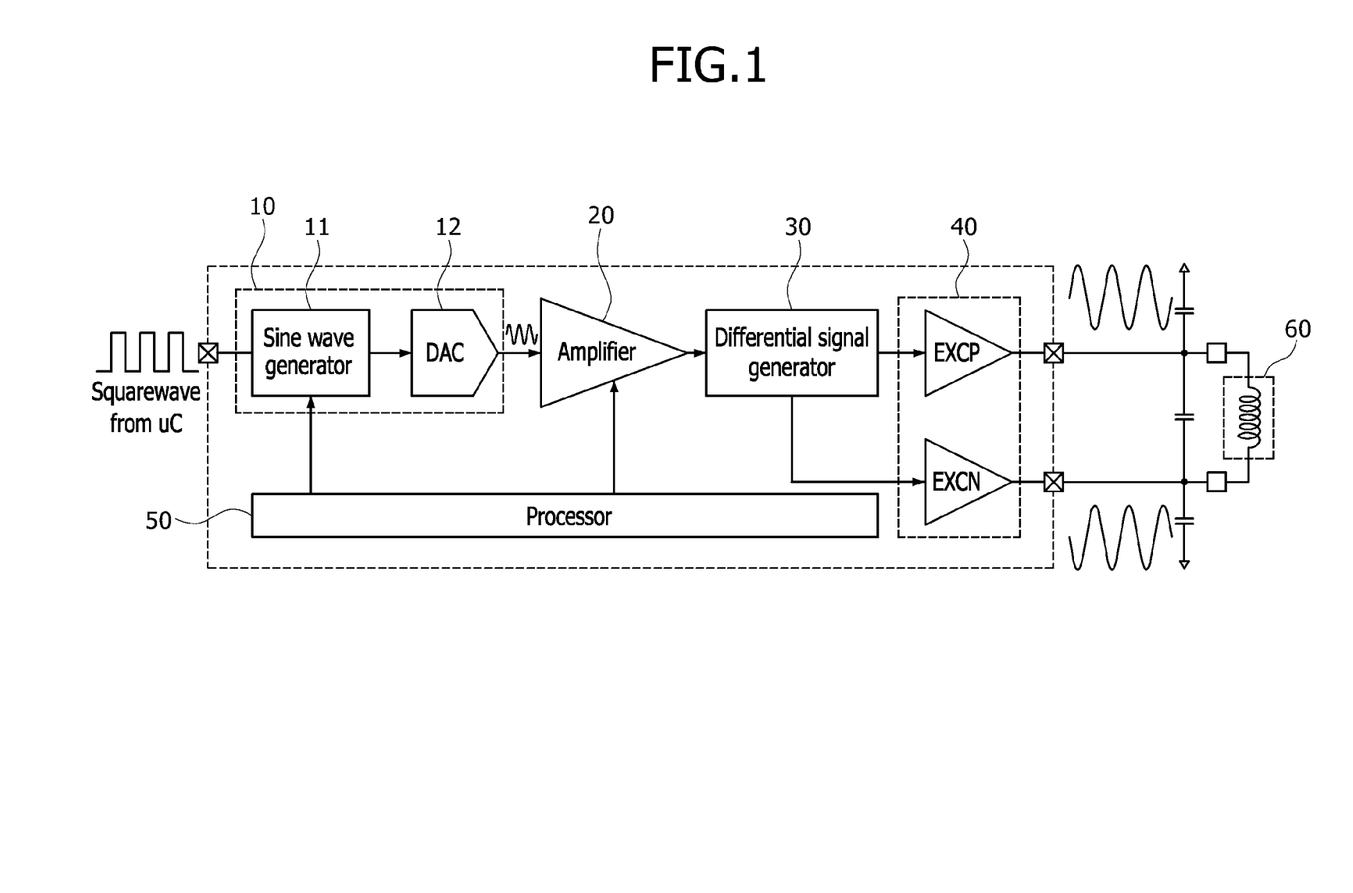
FIG. 1 is a circuit diagram of an apparatus for generating an excitation signal for a resolver according to an embodiment of the present disclosure.
Figure 2:
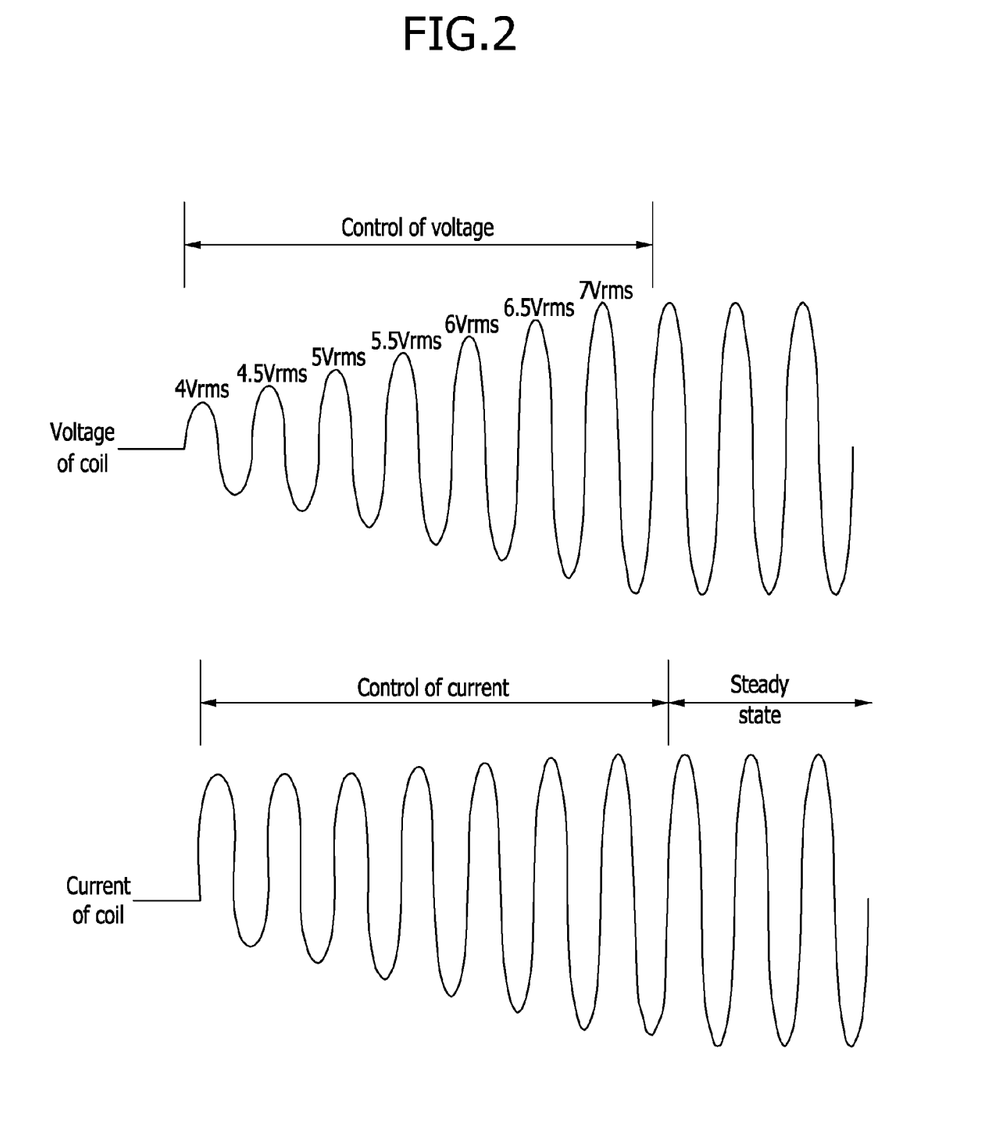
FIG. 2 is a diagram illustrating voltages and currents of a coil in a transient response interval according to an embodiment of the present disclosure.
Figure 3:
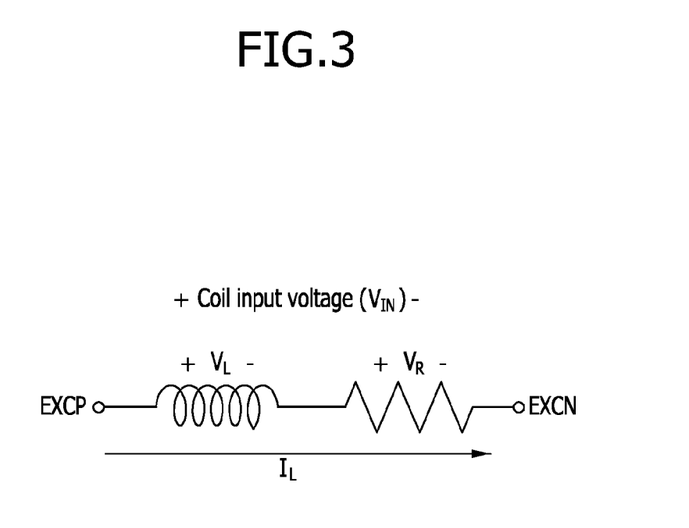
FIG. 3 is a diagram for illustrating a relation between voltages and currents of the coil according to an embodiment of the present disclosure.

FIG. 1 is a circuit diagram of an apparatus for generating an excitation signal for a resolver according to an embodiment of the present disclosure. FIG. 2 is a diagram illustrating voltages and currents of a coil in a transient response interval according to an embodiment of the present disclosure. FIG. 3 is a diagram for illustrating a relation between voltages and currents of the coil according to an embodiment of the present disclosure.

Referring to FIG. 1, the apparatus for generating an excitation signal for a resolver according to an embodiment of the present disclosure includes a sine wave generation unit (for example, a sine wave generator) 10, an amplification unit (for example, an amplifier) 20, a differential signal generation unit (for example, a differential signal generator) 30, a driver 40, and a processor 50.

The sine wave generation unit 10 receives a square wave from a microcomputer (not illustrated), and generates a sine wave by using the square wave.

In this case, the sine wave is used to obtain the angle of a rotor as an excitation signal that is applied to a coil 60.

The sine wave generation unit 10 includes a sine wave generator 11 and a digital analog converter (DAC) 12.

The sine wave generator 11 generates a digital code of two bits or more according to the time of a cycle of the square wave, and transmits the digital code to the DAC 12.

In this process, the amplification ratio (or a gain) of the sine wave generator 11 may be adjusted by the processor 50. When the amplification ratio of the sine wave generator 11 is adjusted, the output of the DAC 12, that is, the voltage of the sine wave is adjusted.

The amplification ratio of the sine wave generator 11 may be set based on a start voltage.

The start voltage is a voltage at which a soft start is performed, and is relatively lower than a target voltage to be applied to a primary side of the coil 60. The start voltage may be variously adjusted based on the target voltage.

In general, the target voltage may be set in the range of 1 Vrms to 7 Vrms. The start voltage may be calculated as a voltage lower than the target voltage.

For example, if the target voltage is 7 Vrms, the start voltage may be calculated as 4 Vrms. If the target voltage is 4 Vrms, the start voltage may be calculated as 2 Vrms.

The start voltage may be divided into a plurality of voltage ranges. The start voltage calculated by the processor 50 belongs to any one of the plurality of voltage ranges.

The amplification ratio of the sine wave generator 11 may be adjusted based on a voltage range to which the start voltage belongs, among the voltage ranges of the start voltage.

The voltage of the sine wave that is output by the DAC 12 is adjusted by the amplification ratio of the sine wave generator 11 which has been adjusted as described above.

The DAC 12 converts the digital code into an analog value. That is, the DAC 12 converts, into a sine wave signal, the digital code according to an input time from the sine wave generator 11. In this case, the DAC 12 converts, into an analog value, the digital code that has been amplified at the amplification ratio of the sine wave generator 11, so that the voltage of the sine wave that is output by the DAC 12 is adjusted.

The amplification unit 20 amplifies the sine wave to a voltage having a desired level, which is input from the sine wave generation unit 10.

The amplification ratio of the amplification unit 20 may be adjusted by the processor 50. As the amplification ratio of the amplification unit 20 is adjusted, the voltage of the sine wave is adjusted. The amplification ratio of the amplification unit 20 may be set based on a start voltage. The start voltage may be divided into a plurality of voltage ranges as described above. The amplification ratio of the amplification unit 20 may be adjusted based on a voltage range to which the start voltage belongs, among the voltage ranges of the start voltage. As described above, the voltage of the sine wave is adjusted by the amplification ratio of the amplification unit 20.

In this case, the amplification unit 20 may be a programmable gain amplifier (PGA), but is not especially limited thereto.

The differential signal generation unit 30 generates a differential signal based on the sine wave that is received from the amplification unit 20. The differential signal generation unit 30 may be formed of a circuit including an OP-amp.

The driver 40 inputs, to both ends of an input stage of the coil 60, the differential signal generated by the differential signal generation unit 30.

The processor 50 increases the voltage of the sine wave from the start voltage to a target voltage by controlling the sine wave generation unit 10 and the amplification unit 20 whenever one cycle elapses based on a transient current that flows into the coil 60 in a transient response interval.

Accordingly, a voltage that flows into the coil 60 rises up to the target voltage step by step. At this time, an overcurrent can be prevented from flowing into the coil 60 in the transient response interval because a current that flows into the coil 60 is limited.

FIG. 2 illustrates an example in which if a target voltage is 7 Vrms and a start voltage is 4 Vrms, an overcurrent is prevented from flowing into the coil 60 in a transient response interval by raising a voltage that flows into the coil 60 step by step by a set voltage, for example, 0.5 Vrms from the start voltage to the target voltage.

More specifically, the processor 50 calculates a maximum current which may flow into the coil 60, based on the target voltage.

In general, the primary side of the coil 60 may be modeled in a form in which an inductor having several mH and a resistor having several or several tens of ohm (Ω) are connected in series.

A current that flows into the coil 60 is generated as $$v_L(t) = L\frac{di_L(t)}{dt}$$

based on a voltage at both ends of the inductor. When a sine wave voltage is applied to both ends of the coil 60, a relation between voltages and currents, which is illustrated in FIG. 3, is obtained.

In this case, the relation between voltages and currents within the coil 60 is the same as Equation 1.

$$V_{IN}(t) = L\frac{di_L(t)}{dt} + R \cdot i_L(t) \quad (1)$$

In Equation 1, $V_{IN}$ is the voltage of a sine wave within the coil 60, $i_L$ is a current that flows into the coil 60, L is inductance, R is resistance, and t is time.

If the inductance and resistance of the coil 60 are applied to the relation between voltages and currents in Equation 1, a maximum current in a transient response interval can be known by calculating a maximum current up to the first cycle in which the voltage of the sine wave has been applied.

When the maximum current in the transient response interval is calculated, the processor 50 determines whether the maximum current in the transient response interval is a preset threshold current or more by comparing the maximum current with the threshold current.

The threshold current is a maximum-permissible current that is permitted by the driver (EXCP and EXCN) 40. The threshold current may be different depending on characteristics of the driver 40.

If the maximum current in the transient response interval is the threshold current or more as a result of the comparison between the maximum current in the transient response interval and the threshold current, the processor 50 calculates a start voltage based on a target voltage.

For example, if a maximum-permissible current that is permitted by the driver 40, that is, the size of an EXCP and EXCN block (element), is 120 mA, the voltage $V_{IN}$ of a sine wave is 5 Vrms@10 kHz, inductance L is 1.5 mH, and resistance R is 5Ω, a calculated maximum current up to the first cycle is 138.4 mA.

The maximum current 138.4 mA is a threshold current, that is, the maximum-permissible current 120 mA or more that is permitted by the size of the EXCP and EXCN element. Accordingly, the processor 50 calculates a start voltage based on a target voltage.

The processor 50 sets the start voltage to be relatively lower than the target voltage.

For example, the processor 50 may calculate the start voltage as 4 Vrms if the target voltage is 7 Vrms, and may calculate the start voltage as 2 Vrms if the target voltage is 4 Vrms.

In general, to implement a change in the voltage having a wide range in which the voltage of a sine wave is 1 Vrms to 7 Vrms only in the amplification unit 20 has limitations in terms of hardware.

For example, if a change in the voltage having a wide range is implemented in the amplification unit 20, the amplification ratio of the amplification unit 20 needs to be generated up to a maximum of "7". In a process of converting a signal from a high voltage range of the EXCP and EXCN element to a low voltage range thereof, the amplification unit 20 essentially has an amplification ratio of 5. Accordingly, the sine wave signal (i.e., the output of the DAC 12) that has been first generated may be finally amplified up to a maximum of 35 times. If the amplification ratio of the amplification unit 20 is very large as described above, an unwanted non-linear characteristic may be increased because distortion, such as noise, is greatly amplified in the output of the DAC 12. Accordingly, it is advantageous to reduce a total amplification ratio to 10 or less and to set the amplification ratio of the amplification unit 20 to "2" or less.

Therefore, in order to reduce a change in the voltage having a wide range and the distortion of a signal, the processor 50 adjusts the voltage of a sine wave by combining the sine wave generation unit 10 and the amplification unit 20, based on a voltage range to which a corresponding start voltage belongs.

To this end, first, the processor 50 determines a voltage range to which the corresponding start voltage belongs, among these voltage ranges.

For example, if a target voltage is set in the range of 1 Vrms to 7 Vrms as described above, a voltage range of a start voltage may be divided into a first voltage range of 1 Vrms to 4 Vrms and a second voltage range of more than 4 Vrms to 7 Vrms or less.

In this case, the start voltage belongs to any one of the first voltage range and the second voltage range.

Accordingly, the processor 50 determines whether the start voltage belongs to the first voltage range or the second voltage range, and increases the voltage of the sine wave from the start voltage to the target voltage by combining the sine wave generation unit 10 and the amplification unit 20, based on a result of the determination.

First, when the start voltage belongs to the first voltage range, the processor 50 adjusts the voltage of the sine wave by fixing the amplification ratio of the amplification unit 20 to a minimum value 1 and adjusting the amplification ratio of the sine wave generator 11.

In contrast, when the start voltage belongs to the second voltage range, the processor 50 adjusts the voltage of the sine wave in a way to fix the output of the DAC 12 to a maximum value by adjusting the amplification ratio of the sine wave generator 11 to the maximum value and adjusting the amplification ratio of the amplification unit 20 to "1" or more.

The amplification ratios of the sine wave generator 11 and the amplification unit 20 for each start voltage are listed in Table 1.

If a target voltage (V_EXCP/V_EXCN) is selected (4 Vrms to 7 Vrms, a 0.5 Vrms unit) (upon actual application, an output voltage of 4 Vrms to 7 Vrms is chiefly used), the processor 50 may be implemented as an arbitrary register capable of generating a 3-bit control signal.

Furthermore, the processor 50 may be implemented as an arbitrary register capable of generating a 1-bit control signal in order to determine whether a soft start is performed.

Furthermore, if a start voltage (1 Vrms to 6.5 Vrms) and a set voltage (0.5 Vrms) for a soft start are set, the processor 50 may be implemented as an arbitrary register capable of generating a 4-bit control signal.

Hereinafter, a method of generating an excitation signal for a resolver according to an embodiment of the present disclosure is described in detail with reference to FIG. 4.

Figure 4:
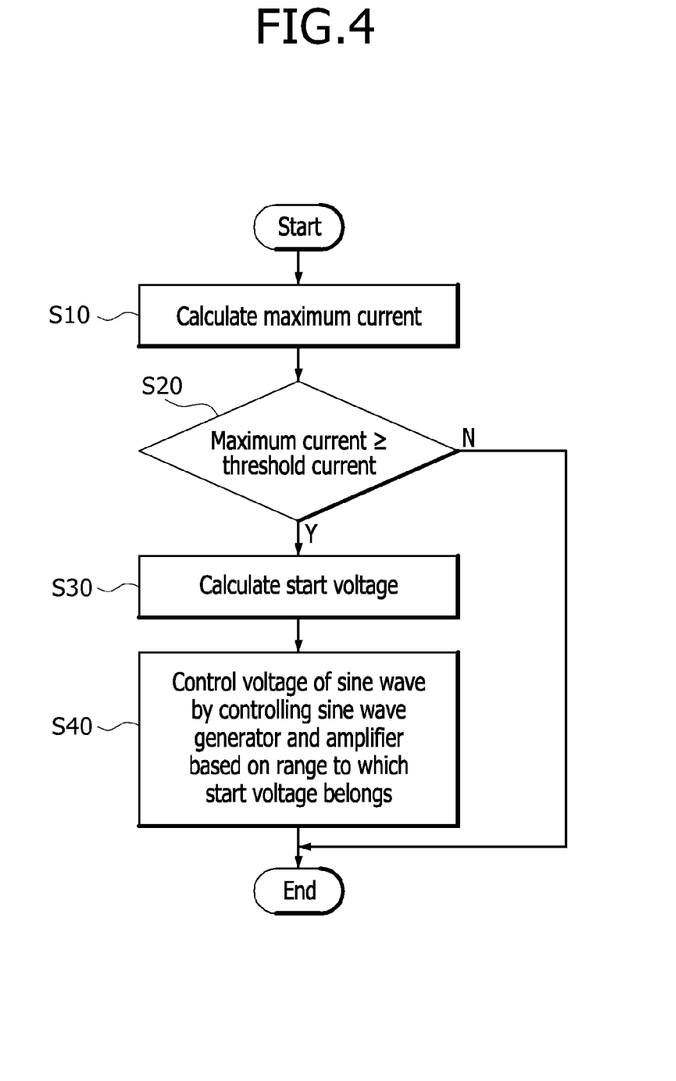
FIG. 4 is a flowchart of a method of generating an excitation signal for a resolver according to an embodiment of the present disclosure.

FIG. 4 is a flowchart of a method of generating an excitation signal for a resolver according to an embodiment of the present disclosure.

Referring to FIG. 4, first, the processor 50 calculates a maximum current which may flow into the coil 60, based on a target voltage (S10).

Next, the processor 50 determines whether the maximum current calculated in a transient response interval is a threshold current or more by comparing the maximum current in the transient response interval with the threshold current (S20).

If, as a result of the determination in step S20, the maximum current in the transient response interval is the threshold current or more, the processor 50 calculates a start voltage based on the target voltage (S30).

When the start voltage is calculated, the processor 50 controls the voltage of a sine wave by controlling the sine wave generation unit 10 and the amplification unit 20 based on a voltage range to which the start voltage belongs (S40).

That is, the processor 50 determines whether the start voltage belongs to a first voltage range or a second voltage range, and increases the voltage of the sine wave from the start voltage to the target voltage by combining the sine wave generation unit 10 and the amplification unit 20 based on a result of the determination.

For example, when the start voltage belongs to the first voltage range, the processor 50 adjusts the output of the DAC 12 by fixing the amplification ratio of the amplification unit 20 to a minimum value 1 and adjusting the amplification ratio of the sine wave generator 11.

TABLE 1

| Vrms@EXCP/EXCN | AMPLIFICATION RATIO OF SINE WAVE GENERATOR | AMPLIFICATION RATIO OF AMPLIFICATION UNIT |
| --- | --- | --- |
| 1 Vrms to 4 Vrms | Adjusted | Fixed to a minimum value "1" |
| More than 4 Vrms to 7 Vrms or less | Fixed to a maximum value | Adjusted |

For example, if a maximum-permissible current that is permitted by the size of the EXCP and EXCN element of the driver 40 is 120 mA, the voltage $V_{IN}$ of a sine wave is 5 Vrms@10 kHz, inductance L is 1.5 mH, and resistance R is 5Ω, a calculated maximum current up to the first cycle is 138.4 mA.

In this case, if a start voltage is calculated as 4 Vrms and the voltage of the sine wave is increased from the start voltage by a set voltage of 0.5 Vrms, a maximum transient current up to the third cycle is 111.8 mA. This reveals that an overcurrent does not flow into the coil 60 in a transient response interval.

In contrast, when the start voltage belongs to the second voltage range, the processor 50 adjusts the voltage of the sine wave in a way to fix the output of the DAC 12 to a maximum value by adjusting the amplification ratio of the sine wave generator 11 to the maximum value and adjusting the amplification ratio of the amplification unit 20 to "1" or more.

A transient current that flows into the coil 60 can be limited within an actual application range by increasing the voltage of the sine wave step by step from the start voltage to the target voltage as described above.

As described above, the apparatus and method for generating an excitation signal for a resolver according to the embodiments of the present disclosure can prevent an overcurrent greater than an actual application range from flowing into the coil 60 by increasing the voltage of an excitation signal up to a target voltage step by step based on a transient current that flows into the coil 60, and can thus reduce a cost price by reducing the size of the driver 40 that inputs a differential signal to the coil 60.

In contrast to conventional systems, in which a relatively large driver is used to supplement the problem of an overcurrent that is out of an actual application range that may flow in a transient response due to characteristics of the resolver before the state of the excitation signal reaches a normal state, the present disclosure may avoid requiring a size of a driver that applies the excitation current to the resolver being relatively large, thereby avoiding a corresponding increase in cost price.

The present disclosure provides an apparatus and method for generating an excitation signal for a resolver that can prevent an overcurrent greater than an actual application range from flowing into the coil by increasing a voltage of an excitation signal up to a target voltage step by step based on a transient current that flows into the coil, and can thus reduce a cost price by reducing the size of the driver that inputs a differential signal to the coil.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The term "unit" used in the present embodiment refers to software or hardware components such as a field-programmable gate array (FPGA) or an application specific integrated circuit (ASIC), and "unit" performs certain roles. However, "unit" is not limited to the software or the hardware. "unit" may be present in an addressable storage medium or may refresh one or more processors. Thus, as an example, "unit" includes components such as software components, object-oriented software components, class components, and task components and may include processes, functions, properties, procedures, sub-routines, segments of a program code, drivers, firmwares, microcodes, circuits, data, database, data structures, tables, arrays, and variables. Functions provided in the components and "unit" may be combined into a smaller number of components and "units" or may be further separated into additional components and "units". In addition, the components and "units" may be implemented to reproduce one or more central processing units (CPUs) in a device or a security multimedia card.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for excitation signal generation for a resolver, the apparatus comprising:
   a sine wave generator configured to generate a sine wave based on a square wave;
   an amplifier configured to amplify the sine wave;
   a differential signal generator configured to convert, into a differential signal, the amplified sine wave;
   a driver configured to input the differential signal to a coil; and
   a processor configured to generate an excitation signal by increasing a voltage of the sine wave from a start voltage to a target voltage through at least one of the sine wave generator and the amplifier based on a transient current that flows into the coil in a transient response interval.

2. The apparatus of claim 1, wherein in response to a maximum current of the transient current in the transient response interval meeting or exceeding a preset threshold current, the processor is configured to increase the voltage of the sine wave up to the target voltage through at least one of the sine wave generator and the amplifier.

3. The apparatus of claim 1, wherein the processor is configured to increase the voltage of the sine wave step by step by a set voltage from a preset start voltage whenever one cycle elapses.

4. The apparatus of claim 1, wherein the start voltage is adjusted based on the target voltage.

5. The apparatus of claim 1, wherein the processor is configured to adjust an amplification ratio of the sine wave generator.

6. The apparatus of claim 1, wherein the processor is configured to adjust an amplification ratio of the amplifier.

7. The apparatus of claim 1, wherein the processor is configured to:

divide the start voltage into a plurality of voltage ranges; and control at least one of the sine wave generator and the amplifier based on a voltage range to which the start voltage belongs, among the voltage ranges.

8. The apparatus of claim 7, wherein when the start voltage belongs to a first voltage range, the processor is configured to fix an amplification ratio of the amplifier and adjust an amplification ratio of the sine wave generator.

9. The apparatus of claim 8, wherein the processor is configured to fix the amplification ratio of the amplifier to a minimum value.

10. The apparatus of claim 7, wherein when the start voltage belongs to a second voltage range, the processor is configured to fix an amplification ratio of the sine wave generator and adjust an amplification ratio of the amplifier.

11. The apparatus of claim 10, wherein the processor is configured to fix the amplification ratio of the sine wave generator to a maximum value.

12. A method of excitation signal generation for a resolver, the method comprising:

calculating, by a processor, a transient current that flows into a coil in a transient response interval; and generating an excitation signal by increasing, by the processor, a voltage of a sine wave from a start voltage to a target voltage through at least one of a sine wave generator and an amplifier based on the transient current.

13. The method of claim 12, wherein increasing the voltage of the sine wave from the start voltage to the target voltage further comprises, in response to a maximum current of the transient current in the transient response interval meeting or exceeding a preset threshold current, increasing, by the processor, the voltage of the sine wave up to the target voltage through at least one of the sine wave generator and the amplifier.

14. The method of claim 12, increasing the voltage of the sine wave from the start voltage to the target voltage further comprises:

increasing the voltage of the sine wave step by step by a set voltage from a preset start voltage whenever one cycle elapses.

15. The method of claim 12, wherein the start voltage is adjusted based on the target voltage.

16. The method of claim 12, wherein increasing the voltage of the sine wave from the start voltage to the target voltage further comprises:

adjusting an amplification ratio of the sine wave generator.

17. The method of claim 12, wherein increasing the voltage of the sine wave from the start voltage to the target voltage further comprises:

adjusting an amplification ratio of the amplifier.

18. The method of claim 12, wherein increasing the voltage of the sine wave from the start voltage to the target voltage further comprises:

dividing the start voltage into a plurality of voltage ranges, and controlling at least one of the sine wave generator and the amplifier based on a voltage range to which the start voltage belongs, among the voltage ranges.

19. The method of claim 18, wherein increasing the voltage of the sine wave from the start voltage to the target voltage further comprises:

when the start voltage belongs to a first voltage range, fixing, by the processor, an amplification ratio of the amplifier and adjusting an amplification ratio of the sine wave generator.

20. The method of claim 19, wherein increasing the voltage of the sine wave from the start voltage to the target voltage further comprises:

fixing the amplification ratio of the amplifier to a minimum value.

* * * * *